Patented Nov. 25, 1941

2,263,785

UNITED STATES PATENT OFFICE 2,263,785

HYDROXY-KETONES OF PREGNANE SERIES

Tadeus Reichstein, Zurich, Switzerland, assignor, by mesne assignments, to Roche-Organon, Inc., Nutley, N. J., a corporation of New Jersey No Drawing. Application January 20, 1938, Serial No. 186,006. In the Netherlands January 20, 1937

6 Claims. (Cl. 260—397.4)

It has been found that methyl-[cyclopentano-dimethyl-polyhydro-polyoxy-phenanthrene]-ketones can be prepared by degradation of corresponding α-[cyclopentano-dimethyl-polyhydro-polyoxy-phenanthrene]-propionic acids or their alkyl esters according to the method of Barbier & Loquin [C. r. 156, 1443, 1913]. This method has already been applied by Wieland, Schlichting, Jacobi [Z. phys. Ch. 161, 80, 1926] for the degradation of the side-chain in cholanic acid.

It has now been found that the oxydative degradation is also possible with α-[cyclopentano-dimethyl-polyhydro-phenanthrol]-propionic acids, in the ring-system of which further hydroxyl groups are substituted. In this way the above ketones are obtained.

It was found that not only α-[cyclopentano-dimethyl-perhydro-phenanthrol]-propionic acids but also unsaturated α-[cyclopentano-dimethyl-polyhydro-phenanthrol]-propionic acids with a double bond in the ring-system are suitable for this reaction provided that, before treatment with oxidants a halogen or a hydrogen halide, which can be removed from the degradation products, is added to the double bond.

Not only is it possible in this way to prepare substances hitherto rare or unknown but also the yield is relatively large. Such was not to be expected especially in view of the number of substituents in the ring-system. So substances which may be used for the synthesis of therapeutically active substances will become less expensive.

The course of the reaction is elucidated by the following scheme:

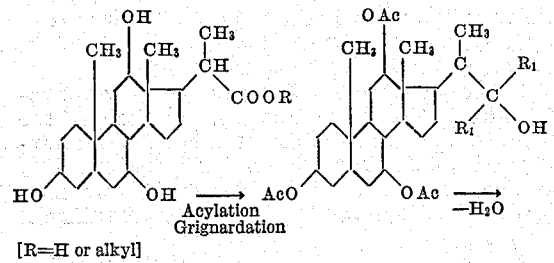

[R=H or alkyl]

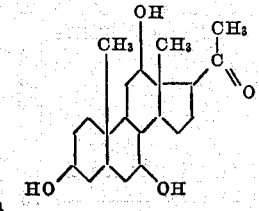

It is however possible to increase the yield of [methyl - cyclopentano - methyl - polyhydro-polyoxy-phenanthrene]-ketones still further. In this case not one of the substituted propionic acids described above is used as a starting material but higher fatty acids substituted in the same way; however, the C-atom C.20 must always bear one CH₃-group.

These substances, whether or not esterified, are submitted to an analogous treatment such as application of Grignard's reaction, acylation, if desired splitting off of water [when a double bond is present in a ring it must be protected by the addition of a halogen- or of a hydrogen halide] and oxidation after which the halogen- or hydrogen halide is removed again. This treatment is repeated as long as any ketones are formed. The ketones formed by the successive oxidations are separated and, according to known methods, saponified and purified.

*Example.*—200 g. of cholic acid are methylated according to Werner [diss. München, 1937] in methanol with hydrochloric acid and recrystallised from methanol. Yield 171 g. [M. P. 156–158° corr.].

45 g. of ester are dissolved in 200 cm.³ benzene and gradually added to an ethereal solution of a Grignard-compound prepared from 25 g. Mg and 105 g. CH₃I. The mixture is boiled with reflux for 6 hours on the water-bath and poured into 1 kg. of ice and 120 cm.³ concentrated HCl. The product of the reaction is extracted with ethyl-acetate, acidified, washed until neutral reaction and the solvent is distilled in vacuo. The residue is saponified in alkaline methanol whereupon water is added; the methanol is evaporated in vacuo and the residue is extracted with ethyl-acetate. The solvent is evaporated again and the residue crystallised from methanol. The yield is 25 g. of dimethyl-3,7,12-trihydroxy-nor-cholyl-carbinol [M. P. 184–185° C. corr.]. From the mother-liquor further 15 g. may be prepared as a hydrate by evaporation and addition of acetone.

64 g. of carbinol are heated for 18 hours on a boiling water-bath with 300 cm.³ dry pyridine and 300 cm.³ freshly distilled acetic anhydride, then evaporated to dryness in vacuo at 60° C. and shaken with water and ether. The ethereal solution is washed with dilute HCl and $Na_2CO_3$-solution and evaporated to dryness; 92 g. of crude product remain. By recrystallisation 47 g. of dimethyl-3,7,12-triacetoxy-nor-cholyl-carbinol-acetate [M. P. 108.5–112° C.] are obtained and from the mother-liquor further 23 g. of this substance are obtained [M. P. 105–111° C.]. 90 g. of tetra-acetylcarbinol are oxidized with 61 g. of $CrO_3$ in glacial acetic acid. In this way 17 g. of neutral substances and 57 g. of crude acid are obtained. From the neutral fraction 10 g. of ketones may be separated by means of Girard's reagent; 6.3 g. of ketone-free substances remain.

By recrystallisation, etc., from the crude acid 32 g. of crystalline nor-cholic acid are obtained as well as 1.8 g. of bis-nor-cholic-acid [M. P. 298–304° C.] whereas after saponification of the residual resinous acid 11 g. of cryst. nor-cholic-acid are obtained. 12 g. of tri-acetyl-nor-cholic-acid are saponified with 7.5 g. of KOH. On acidifying 7.5 g. of the hydrate [1st M. P. 147–150° C., 2nd M. P. 172° C.] precipitate. From the mother-liquor further 2 g. of nor-cholic-acid may be obtained. The nor-cholic acid is well dried whereafter its M. P. is 188–192° C. corr.

$[\alpha]^{18}_D = +59.4°$ $[c=0.4711$ in abs. ethanol]

7 g. of nor-cholic-acid are subjected to a treatment analogous to that described above for cholic acid. In this manner 5.5 g. of methyl-ester [M. P. 159–161° C. corr.] are obtained from 7 g. of nor-cholic acid. By treatment with methyl-magnesium-bromide 4 g. of dimethyl-[3, 7, 12-trihydroxy - bis - nor-cholyl] - carbinol [M. P. 238–242° C. corr.] are obtained from 5 g. of nor-cholic-methylester. After acetylation the melting point is 129–131° C.

5 g. of this tetra-acetate are oxidized with 3.5 g. of $CrO_3$ after which 1.3 g. of neutral fraction and 2.7 g. of resinous acid are obtained. From the neutral fraction 0.8 g. of ketones and 0.5 g. of ketone-free fraction may be separated by means of Girard's reagent. The acetylated resinous acid [2.7 g.] is saponified with alkali in which way 1.1 g. of bis-nor-cholic acid [M. P. 285–296° C. corr.] are obtained.

$[\alpha]^{18}_D = +13.8°$ $[c=0.578$ in abs. ethanol]

4.9 g. of bis-nor-cholic acid are treated as described for cholic acid. In the first phase 2.9 g. of methylester are obtained [1st M. P. 97–98°; 2nd M. P. 156–159° C.] $[\alpha]^{17}_D = +220°$ $[c=0.5448$ in abs. ethanol]. 4.1 g. of bis-nor-cholic-methyl-ester are treated with a Grignard's solution prepared from 4.2 g. of Mg and 28 g. of $C_6H_5Br$ and 3.8 g. of carbinol are obtained which are acetylated. In this way 3 g. of a crystalline product are formed [M. P. 252° C. corr.].

$[\alpha]^{18}_D = +23.11°$ $[c=0.649$ in abs. ethanol]

2.2 g. of tri-acetylcarbinol are boiled for 6 hours in glacial acetic acid by which water is splitted off. From the residue 1.7 g. of 1,1-diphenyl-methyl-[3,7,12-triacetoxy-aetiocholyl] - ethylene [M. P. 182–183° C. corr.] can be obtained.

$[\alpha]^{20}_D = +423.6°$ $[c=0.5265$ in abs. ethanol]

1.25 g. of this substance solved in 100 cm.³ $CHCl_3$ are ozonized at 0° C. for 20 minutes [corresponding to 0.28 g. $O_3$ instead of 0.1 g. according to theory]. The chloroform is eliminated, 30 cm.³ of glacial acetic acid and zinc-splinters are added and the mixture is heated on the water-bath until potassium-iodide-starch-paper is no longer coloured blue. Then the mixture is evaporated to dryness in vacuo and shaken with water and ether; the ethereal solution is washed with dilute HCl and $Na_2CO_3$-solution. After evaporation of the solvent 1.4 g. of a colourless oil remain which are boiled for 2–3 minutes with 3 g. of Girard's reagent T, 20 cm.³ of methanol and 1 cm.³ glacial acetic acid. The mixture is slowly cooled to room temperature and subsequently cooled with a refrigerant mixture. Then an ice-cold mixture of 18 cm.³ 2N—$Na_2CO_3$ and 12 cm.³ $H_2O$ is added whereupon the whole is 3 times extracted with ether at 0° C. Now the aqueous layer is acidified to Congo with HCl and 3 times extracted with ether at room temperature. The ethereal layers are washed with soda until neutral reaction, the ether is evaporated and 0.6 g. of ketone remain as a colourless oil. The latter is solved in a small amount of ether and pentane is added until turbidity occurs. After a few hours 545 mg. of crystalline 3,7,13-triacetoxy-pregnane-20-on may be filtered off with suction [M. P. 132–134° C.] $[\alpha]^{19}_D = 120.7°$ $[c=0.83$ in abs. ethanol]. This substance is very hygroscopic and easily soluble in most of the organic solvents except petroleumether.

400 mg. of triacetylketone are boiled with reflux for 6 hours with 6 mols methyl-alcoholic-potassium-hydroxide. Water is added and the methanol evaporated in vacuo. The residue is 3 times rapidly shaken at 0° C. with pure ethylacetate. The extracts are washed with a small amount of water dried over sulfate and evaporated in vacuo. A viscous weakly yellow syrup remains which may be crystallized from acetone. Yield 100 mg. M. P. 120–127° C. with decomposition [splitting off of water]. The water-free ketone was not crystallisable and is extremely hygroscopic. $[\alpha]^{18}_D = +107.75°$ $[c=0.1123$ in abs. ethanol]. The 3,7,12-trioxy-pregnane-20-on is rather sparingly soluble in ether and benzene and easily soluble in methanol, ethanol, glacial acetic acid and ethyl acetate.

It is to be understood that the above example will elucidate the invention but that the same is not limited thereto.

What I claim is:

1. Compounds of the cyclopentano-dimethyl-polyhydrophenanthrene series having a side chain of the form —$CO.CH_3$ at the carbon atom $C_{17}$ and having a single substituent selected from the class consisting of hydroxyl and a group convertible into a hydroxyl group by means of hydrolysis in each of more than one of the rings of the polyhydro-phenanthrene nucleus.

2. The cyclopentano-dimethyl - polyhydrophenanthrene derivatives having a side chain of the form —$CO.CH_3$ at the carbon atom $C_{17}$ and having a single substituent from the class consisting of hydroxyl and acyloxyl in each of more than one of the rings of the polyhydrophenanthrene nucleus.

3. The cyclopentano-dimethyl - polyhydrophenanthrene derivatives having a side chain of the form —$CO.CH_3$ at the carbon atom $C_{17}$ and having a single substituent from the class consisting of hydroxyl and acyloxyl at each of the carbon atoms $C_7$ and $C_{12}$.

4. The cyclopentano-dimethyl - polyhydrophenanthrene derivatives having a side chain of the form —$CO.CH_3$ at the carbon atom $C_{17}$ and having a single substituent from the class consisting of hydroxyl and acyloxyl at each of the carbon atoms $C_3$, $C_7$, and $C_{12}$.

5. As a new compound trihydroxy-3,7,12-pregnanone-20, the hydrate of which having a melting point of 120–127° C. $[\alpha]^{18}_D = +107.8°$ $[c=0.1123$ in abs. ethanol] and the structure

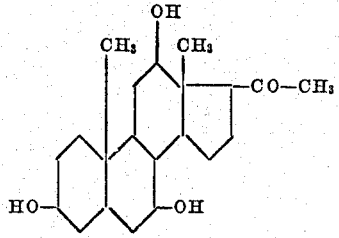

6. As a new compound triacetoxy-3,7,12-pregnanone-20, having a melting point of 132–134° C. $[\alpha]^{19}_D = +120.7°$ $[c=0.83$ in abs. ethanol] and the structure

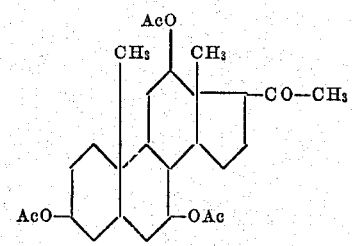

TADEUS REICHSTEIN.